(12) United States Patent
Lederman (10) Patent No.: US 7,386,493 B2
(45) Date of Patent: Jun. 10, 2008

(54) SYSTEM AND METHOD FOR MANAGING CONCENTRATION OF CORPORATE DEBT

(75) Inventor: Lawrence Lederman, Chappaqua, NY (US)

(73) Assignee: Milbank, Tweed, Hadley & McCloy LLP, New York, NY (US)

(*) Notice: Subject to any disclaimer, the term of this patent is extended or adjusted under 35 U.S.C. 154(b) by 0 days.

(21) Appl. No.: 10/064,783

(22) Filed: Aug. 16, 2002

(65) Prior Publication Data

US 2003/0040996 A1    Feb. 27, 2003

Related U.S. Application Data

(60) Provisional application No. 60/315,543, filed on Aug. 26, 2001.

(51) Int. Cl.
*G06Q 40/00* (2006.01)

(52) U.S. Cl. ......................................... 705/35; 705/36 R (58) Field of Classification Search ............. 705/35–37, 705/4

See application file for complete search history.

(56) References Cited

U.S. PATENT DOCUMENTS

| | | | | |
|---|---|---|---|---|
| 4,742,457 A | * | 5/1988 | Leon et al. ..................... | 705/35 |
| 5,206,803 A | * | 4/1993 | Vitagliano et al. ........ | 705/36 R |
| 5,237,500 A | * | 8/1993 | Perg et al. ...................... | 705/35 |
| 5,291,398 A | * | 3/1994 | Hagan ............................ | 705/4 |
| 5,446,653 A | | 8/1995 | Miller et al. | |
| 6,148,293 A | | 11/2000 | King | |
| 7,127,423 B2 | * | 10/2006 | Dunning et al. ........... | 705/36 R |

OTHER PUBLICATIONS

PCT International Search Report, Jun. 5, 2003.

* cited by examiner

*Primary Examiner*—Narayanswamy Subramanian (57) ABSTRACT

A method and system for managing concentration of debt, wherein a condition is associated with debt instruments, and the condition changes at least one parameter of the debt instrument in the event that an entity, such as an investor or group of investors acting in a concerted manner, accumulates a quantity of debt instruments in excess of a threshold level. The threshold level is typically a percentage of outstanding debt instruments. The parameter that is changed may be the maturity, the priority, the rate, or any other similar parameter associated with the value of the debt instrument. The effect of the change in the parameter is to reduce the value of the debt instrument. The change in the parameter may be permanent, or it may be temporary. The condition may be attached or associated with the debt instrument before issue, or it may be attached or associated after the debt instrument has issued. Holders of debt instruments in excess of the threshold may be grandfathered, if the condition is attached to the debt instrument after issue.

17 Claims, 6 Drawing Sheets

BEFORE VULTURE VACCINE

FIG.4

AFTER VULTURE VACCINE

FIG.5

AFTER VULTURE VACCINE

FIG.6

AFTER VULTURE VACCINE

FIG.7

BEFORE VULTURE VACCINE

FIG.8

AFTER VULTURE VACCINE

FIG.9

SYSTEM AND METHOD FOR MANAGING CONCENTRATION OF CORPORATE DEBT

CROSS REFERENCE TO RELATED APPLICATIONS

This application claims priority to U.S. Provisional Patent Application Ser. No. 60/315,543, filed Aug. 26, 2001, entitled "SYSTEM AND METHOD FOR LIMIT OF DEBT ACCUMULATION", the disclosure of which is incorporated herein by reference.

BACKGROUND OF INVENTION

1. Field of the Invention

The present invention relates to investment instruments, and more particularly to methods to control the concentration of debt instruments by individuals or groups acting in concert.

2. Description of the Related Art

Almost all American corporations have protected themselves against unwanted stock accumulations by adopting a shareholders rights plan, commonly called a Poison Pill. The Poison Pill can be adopted by the Board without shareholder approval and limits stock accumulations. Indeed, the Poison Pill was developed to avoid the requirement of shareholder approval to thwart the veto of large stockholders, including institutional investors. By its design, the Poison Pill limits liquidity of accumulators and large holders since blocks cannot be sold that exceed the pill's designated percentage limitations. Investors have all adjusted to the Poison Pill and most shareholders are now comfortable that it is a fixture in the corporate landscape, a necessary corporate device protective of public shareholders, although institutional investors from time to time seek redemption of certain corporate Poison Pills.

Equity shareholders, however, still remain unprotected against accumulation of company debt that trades publicly. When a corporation's fortunes sag or the economy is in a down cycle where corporate debt in many industry segments trades at substantial discounts, accumulators of debt have a powerful say in the future of the corporate enterprise and the value of the equity. Indeed debt accumulators can control the debt structure of a corporation, extract enormous premiums from the equity when covenants have to be amended and can block beneficial reorganizations. Accumulations occur at all levels of the debt structure, including bank debt and other senior public instruments, not only junk bonds. In good times, debt accumulations don't matter (and there is little economic incentive to accumulate) but in hard times accumulators of debt at a discount determine the fate of the enterprise and the value of the equity.

Corporate debt markets and debt accumulators are largely unregulated compared to the regulatory scope of the Williams Act for equity accumulators. For most purposes, debt markets are a wild west. There are no brakes on debt accumulations nor is public reporting required. Accordingly, companies have no advance notice of large accumulations. In some markets, investors can accumulate debt with impunity and become bolder as debt prices sag.

What is needed is a remedy for new issuances of debt securities and remedies for currently traded debt securities, depending on the capital structure of the corporation, that can be adopted by the Board, like a Poison Pill.

SUMMARY OF INVENTION

In one embodiment, the invention provides a method and system for managing concentration of debt, the method comprising determining a debt concentration threshold, and associating a condition with a debt instrument, the condition changing at least one parameter of the debt instrument, the condition available when an entity holds more debt instruments than the debt concentration threshold.

In one embodiment, the debt instrument is issued with the associated condition. In one embodiment, a parameter of the debt instrument is changed. In one embodiment, the change in parameter occurs when an entity holds more debt instruments than the debt concentration threshold. In one embodiment, concentration of debt instruments by entities is monitored. In one embodiment, the debt concentration threshold is changed. In one embodiment, the entity is an investor. In one embodiment, the investor is an individual investor. In one embodiment, the investor is an institutional investor. In one embodiment, the entity is an affiliated group of investors. In one embodiment, the entity is a group of investors acting in concert. In one embodiment, associating the condition with the debt instrument occurs before issue of the debt instrument. In one embodiment, associating the condition with the debt instrument occurs after issue of the debt instrument. In one embodiment, the parameter changed by the condition serves to subordinate the debt instrument to other debt instruments. In one embodiment, the parameter changed by the condition serves to restrict voting. In one embodiment, the parameter changed by the condition serves to restrict redemption of the debt instrument. In one embodiment, the parameter changed by the condition serves to change the series of the debt instrument.

BRIEF DESCRIPTION OF DRAWINGS

The foregoing features and other aspects of the invention are explained in following description taken in conjunction with the accompanying figures wherein.

It is understood that the drawings are for illustration only and are not limiting.

DETAILED DESCRIPTION

Figure 1:
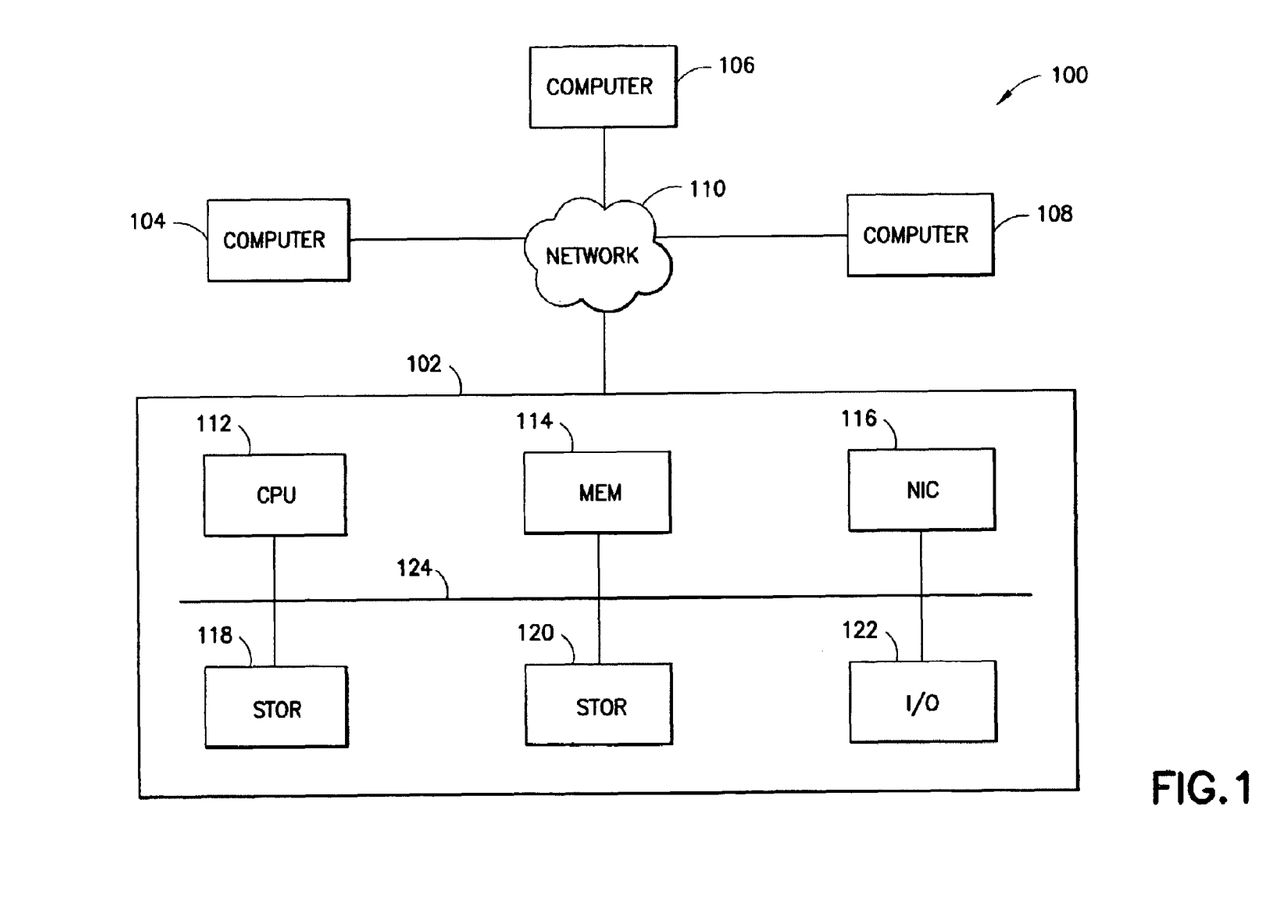
FIG. 1 illustrates a system according to one embodiment of the invention.

Referring to FIG. 1, an embodiment of a system 100 according to the invention typically includes computers 102, 104, 106, 108, interconnected by a network 110, such as the Internet. Computers 102, 104, 106, 108 typically include a processor 112, memory 114, a network interface 116, removable storage 118, fixed storage 120 and input/output 122. The various elements are interconnected by a bus 124. Computers 102, 104, 106, 108 are used by debt instrument issuers, holders, brokers, agents, advisors and secondary markets. The network interconnection 110 between computers 102, 104, 106, 108 allows information exchange on debt instrument holdings and conditions associated with debt instruments.

In various embodiments of the invention, system 100 is used during phases of the issue and administration of debt instruments, as described more fully below.

Figure 2:
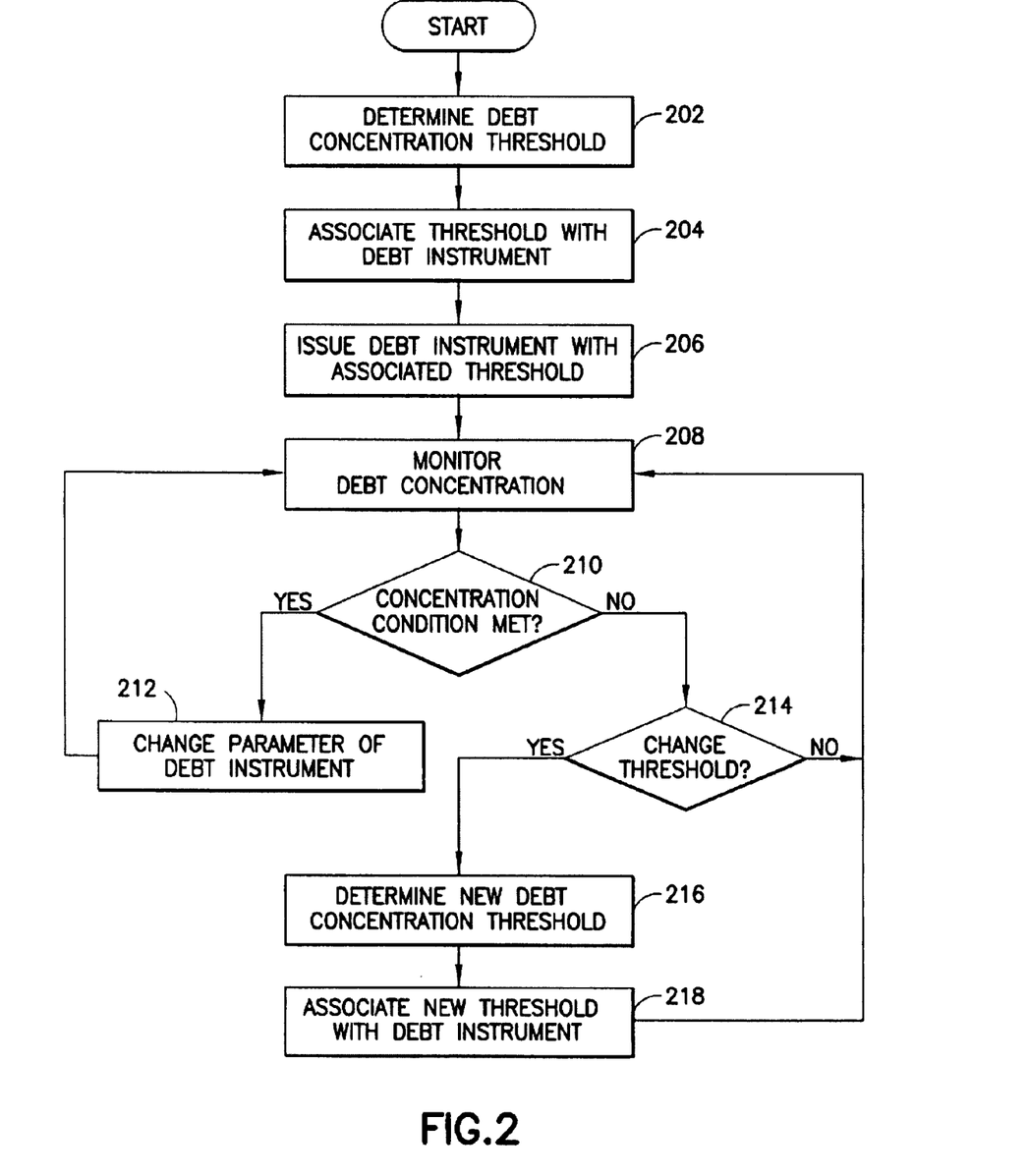
FIG. 2 illustrates a method according to one embodiment of the invention.
Figure 3:
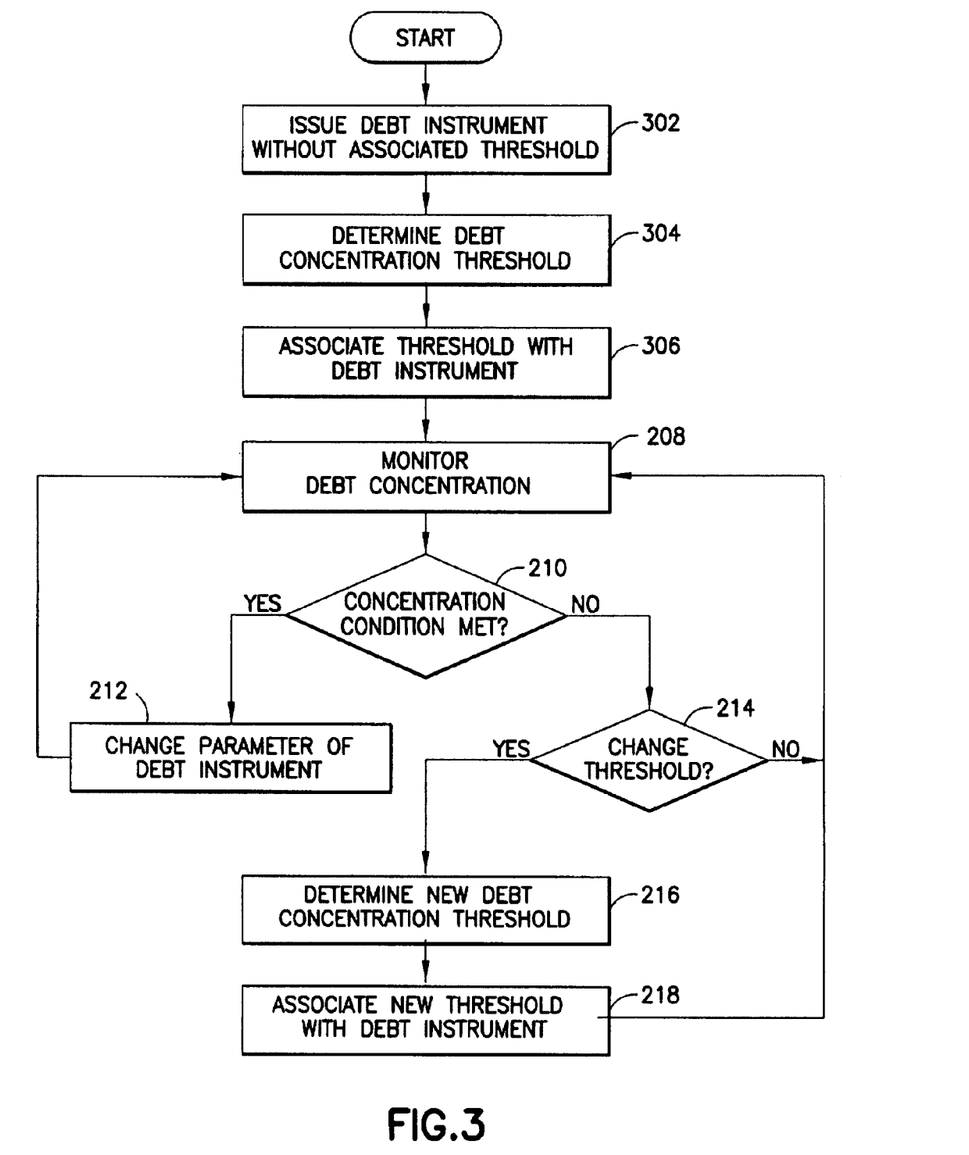
FIG. 3 illustrates a method according to one embodiment of the invention.

FIG. 2 illustrates new debt issuances as one embodiment of the invention, and FIG. 3 illustrates one embodiment of the invention for debt securities that are already traded. Referring first to FIG. 2, at step 202, a debt concentration threshold is determined. In most cases, the threshold is a percentage, although it could be a number of shares, or a dollar amount. The threshold level is set sufficient high so that the concentration of debt holdings of most investors will not reach and cross the threshold, but also sufficiently low that it prevents individual investors, or groups of investors from gaining sufficient leverage to significantly affect operations of the company. The decision on where to set the threshold will consider the diversity of the investor group holding similar debt instruments. For some instruments, a lower threshold may be more appropriate, while other instruments will find a higher threshold more appropriate.

After the debt concentration threshold is determined, then at step 204, the threshold is associated with the debt instrument. Where the instrument itself has terms and conditions, the terms and conditions of the invention are incorporated with those terms and conditions. Alternatively, where the terms and conditions of the instrument are contained in an offering instrument, then the terms and conditions of the invention are incorporated in the offering instrument. There is no particular preference, so long as the terms and conditions are associated with the debt instrument.

At step 206, the new debt instrument and the associated debt concentration threshold is issued.

For each new issue of debt, the indenture or loan instrument provides that: in the event that any entity or affiliated group or entities acting in concert as a group acquires more than some threshold (e.g., 10%) of the principal amount of the indebtedness under the loan instrument, then amounts held in excess of such threshold are deemed to be subordinated to the other debt issued under the loan instrument. In addition, indebtedness exceeding the designated threshold may not be entitled to vote with respect to issues in which a vote is required. Typically, the threshold is a percentage.

To the extent that the instrument provides for a sinking fund, then in another embodiment, indebtedness in excess of the designated threshold is not redeemable until the other indebtedness is fully redeemed. The subordinated debt is deemed a new series under the Indenture or instrument and a new Trustee is appointed for the series, in the event of a default, to comply with the Trust Indenture Act. The prohibition against the formation of groups prohibits "ad hoc committees" of bond holders who aggregate economic and voting power against the issuer. Such terms in the instrument or the indenture are disclosed in the offering circular or prospectus and are binding on the initial purchasers at the time of purchase and thereafter on all subsequent holders. Such consensual arrangements protect the company from accumulators. Since such provision is simple and effective, an investor will not want to cross the threshold. In other words, once the line is drawn, it will be honored.

Once the debt instruments are issued, investors holding the debt instruments may trade them on a secondary market. Although an investor or group of investors may not initially acquire or hold sufficient debt instruments to cross the threshold, during this secondary market trading, they may acquire a sufficient quantity of the particular debt instrument in the secondary market that their holdings cross the threshold. At step 208, the debt instruments holdings of various investors and groups are monitored to detect this event. There are numerous methods for monitoring concentration of debt instruments by individual investors or groups of investors acting in concert, and the method used is not unique to the invention.

At step 210, system 100 checks to see if the concentration threshold conditions have been satisfied. If so, then at step 212, system 100 changes at least one parameter of the debt instrument. It is also possible that multiple parameters of the debt instrument are changed at step 2 2. Once the parameter or parameters are changed, the new parameters are attached to the debt instrument and any subsequent holder of the debt is similarly obligated to abide by the changed parameters. If the parameters were changed at step 212, system 100 returns to step 208 to monitor debt concentrations.

If system 100 determines at step 210 that the debt concentration threshold is not met, then at step 214, system 100 determines whether there is a change in the threshold. Variations in this format are possible for marketing purposes of new issuances of corporate debt, which would include, for example, a 15 or 20% designated threshold percentage at the time of original issue, with the ability of the Board of Directors to bring the threshold percentage down to 10%. Those purchasers who have acquired more than 10% before the re-designation are grandfathered, but not purchasers from them. It is also possible to put limits on the Board in its re-designation, based on the credit rating of the instrument or the discount at which the notes or debentures are trading in the public market. Such constraints are the subject of negotiation, but generally you would expect that the company would want to have freedom to make a change at a time and in a percentage it deemed appropriate.

If system 100 determines that there is a change in the debt concentration threshold at step 214, then at step 216 the new debt concentration threshold is determined, and at step 218, the new threshold is associated with the appropriate debt instruments. System 100 then returns to step 208 to monitor debt concentration.

If system 100 determines that there is no change in the debt concentration threshold at step 214, then system 100 returns to step 208 to monitor debt concentration.

The invention illustrated in FIGS. 1 and 2 is prophylactic and can be adopted by all companies whatever their circumstances. Forward planning, in this case, is non-obtrusive and simple and prevents unexpected mischief in the event of any change in business or market circumstances. Unlike an equity Poison Pill, which can entrench management, the invention is protective of the equity and not a great limitation on the institutions. Many institutions have investments in both debt and equity of the same enterprise and, therefore, by its very nature, the invention, protective of the capital structure, is readily acceptable.

Referring now to FIGS. 1 and 3, another embodiment of the invention applies with respect to currently outstanding debt issuances. In this example, the Board can use another embodiment of the invention, with the same result, following a slightly different tactic from that suggested for original issuances.

At step 302, debt instruments are issued just as they are done without the instant invention, meaning that there is no concentration threshold associated with the debt instruments.

At step 304, after the debt instruments have been issued, the company announces that it has concluded that it is not in the best interests of its shareholders for its debt to be accumulated and adopt a debt rights plan, much in the same way companies announce an equity Poison Pill. In this step, the Board determines the debt concentration threshold, and at step 306, the concentration threshold is associated with the already issued debt instruments. The debt rights plan provides that in the event that any entity or group crosses the designated percentage threshold, the company will issue Rights to its security holders allowing them during a sixty-day period to voluntarily exchange their debt instrument for an instrument which is secured by the assets of the company, subordinated to claims of all superior indebtedness. In other words, in the event of default or liquidation, the holders of the newly exchanged securities can look to the assets of the corporation in preference to the security holders of pari passu debt not entitled to be exchanged. The collateralization provision requires consents of senior indebtedness, which would likely limit liens on all debt, but the new lien can be drafted to be effective only when the newly exchanged debt has a right to payment and all senior debt claims have been satisfied. Therefore, such collateralization does not interfere with any of the rights of the indebtedness. Such consents from senior debt should be obtainable where the corporation is not in default and would be put in a precarious position by debt holders seeking an early exchange of securities or rates that would deplete assets that should be available to the senior debt. More difficult is the situation where the subject debt has its own limitation on liens provision, but that too can be managed by offering a non-current pay interest rate increase or an earlier maturity, which effectively subordinates the instrument in the hands of the accumulator. No consents from senior debt are required where such adjustments are made. The securities to be exchanged can be offered to the holders who hold securities in excess of the designated percentage limiting such accumulators to exchanges up to the designated percentage or the rights can exclude accumulators' indebtedness entirely. The choice to be made depends on the circumstances giving rise to the issuance of the debt rights plan. Generally, it would be favorable to encourage the accumulator to exchange or give the accumulator the opportunity to do so, up to the designated percentage, since this encourages disposition of the excess. In any event, this embodiment of the invention is also prophylactic and provides a line above which accumulators will not cross, in the same way stock accumulators will not cross the poison pill threshold. It should be noted that the new security exchanged will bear the subordination provisions described for new issuances of securities. Thus, this new instrument will, by its own terms, limit accumulations. All such exchanges can be effected on a tax free basis to the corporation and the debt holders.

The device of using rights is simple and effective, does not have any detrimental effect on the capital structure of the company, other than to prevent accumulations and is significantly beneficial to the stockholders. Accordingly, all corporations with outstanding indebtedness can use the invention whether or not there is a current problem with their securities. To act after accumulations have occurred is to put a corporation in a position where it has to grandfather the accumulators' incursions into the corporation's debt structure, which might be quite material by the time that corporation finds about it.

In situations where the invention is applied to existing debt, careful examination of the company's outstanding indebtedness is required, but in most situations the invention can be craned to fit into the capital structure without undue conflict. It is best adopted before there is a default.

Once the debt concentration threshold is associated with the debt instruments at step 306, the invention uses the steps (208-218) as illustrated in FIG. 2 to monitor debt concentration and change parameters or change the debt concentration threshold.

Figure 4:
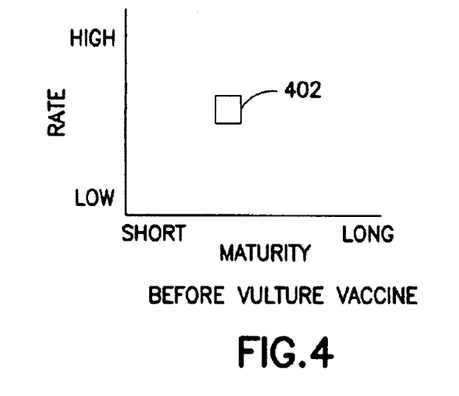
FIG. 4 illustrates parameters of debt instruments without the invention.
Figure 5:
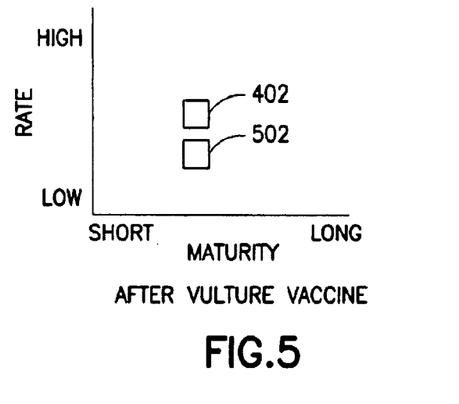
FIGS. 5, 6 and 7 illustrate parameters of debt instruments with the invention.
Figure 6:
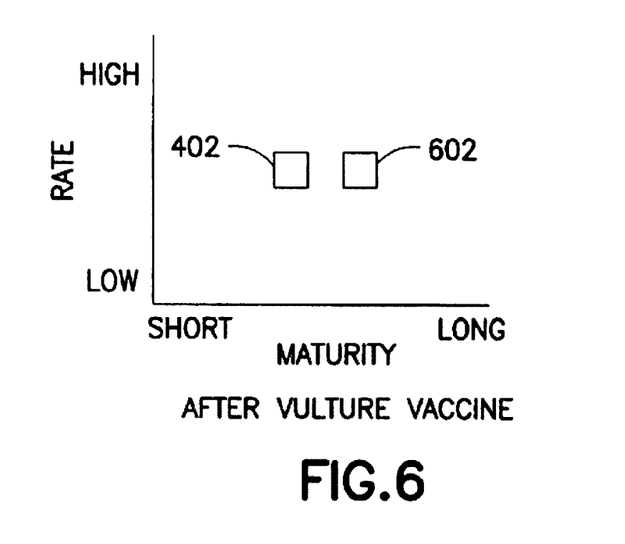
Figure 7:
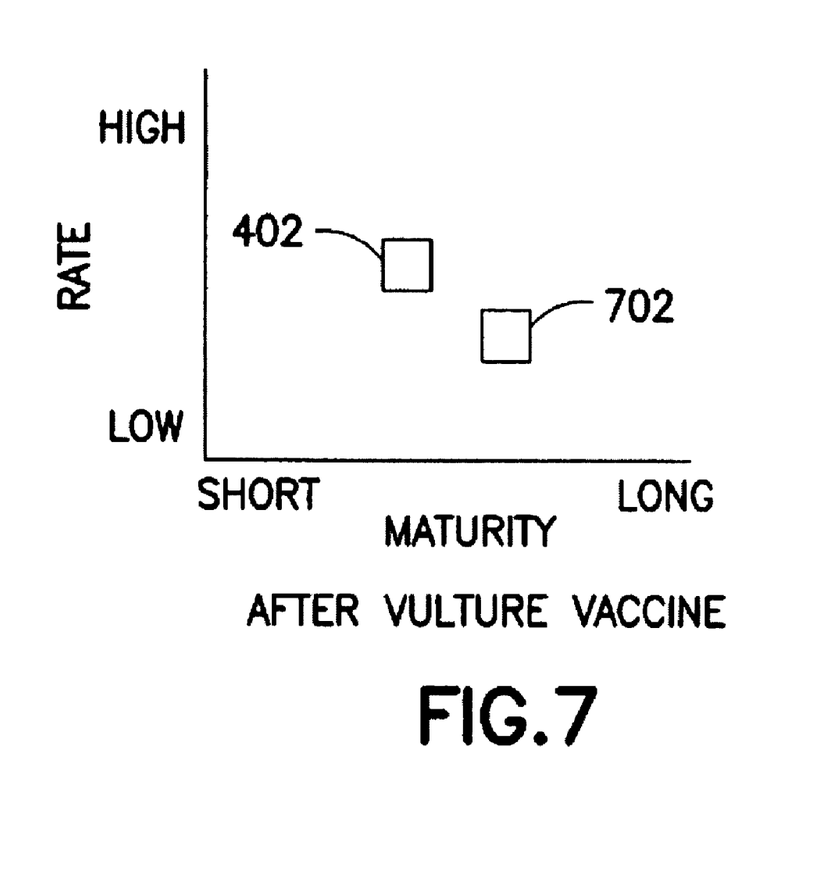

Referring to FIGS. 4-7, some of the different types of parameter changes are illustrated. FIG. 4 illustrates a debt instrument (402) without the invention, where all of the instruments have a particular maturity and a particular rate of return. In FIG. 5, with the invention, some of the debt instruments (402) have the same maturity and rate as illustrated in FIG. 4, but other debt instruments (502) have lower rate of return. Similarly in FIG. 6, some of the debt instruments (402) have the same maturity and rate as illustrated in FIG. 4, but other debt instruments (602) have longer maturity. Finally, in FIG. 7, some of the debt instruments (402) have the same maturity and rate as illustrated in FIG. 4, but other debt instruments (702) have both lower rate of return and longer maturity.

Figure 8:
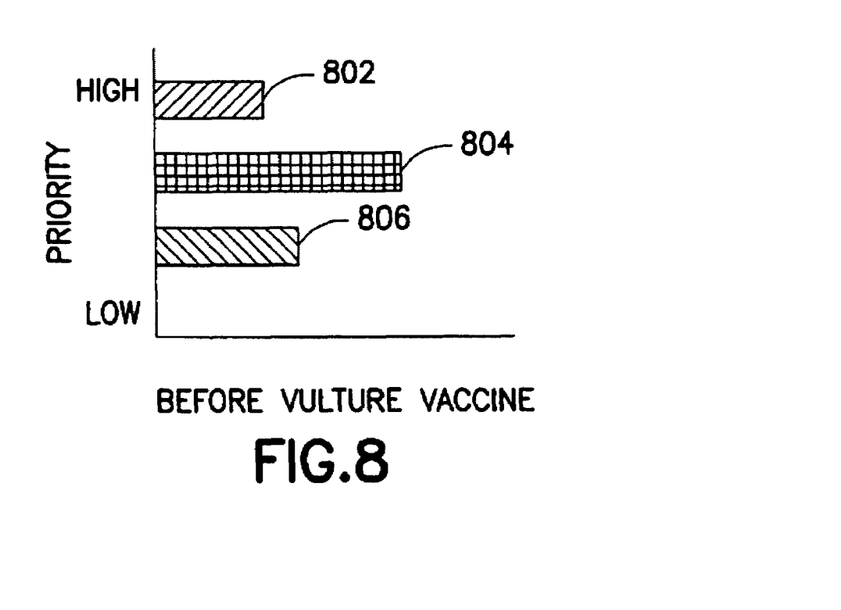
FIG. 8 illustrates parameters of debt instruments without the invention.
Figure 9:
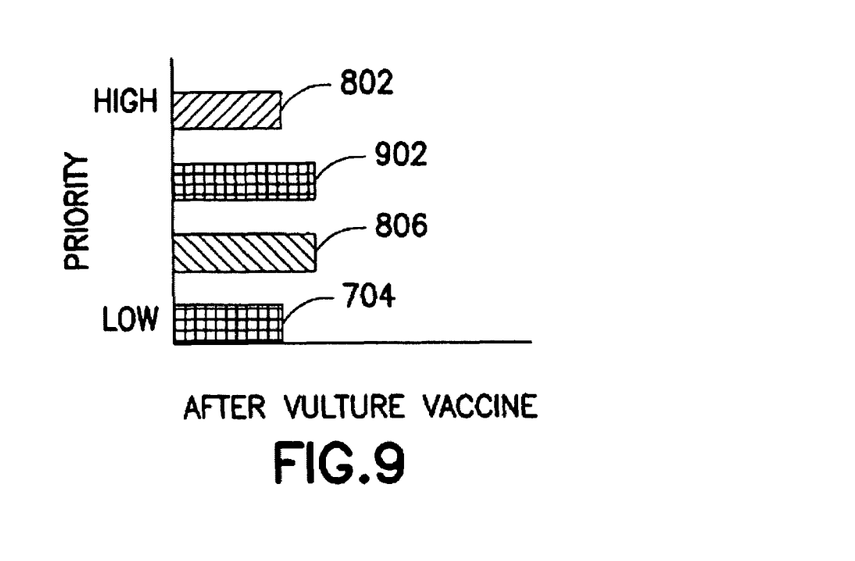
FIG. 9 illustrates parameters of debt instruments with the invention.

Referring to FIGS. 8 and 9, another type of changed parameter of the debt instrument is illustrated. In FIG. 8, without the invention, investors hold different quantities of debt instruments with different priority for the debt instruments (802, 804, 806). In FIG. 9, with the invention, as long as the concentration of a particular debt instrument is below the threshold (802, 806) there is no change in priority. However, for the debt instruments where the concentration is above the threshold (e.g., 804 in FIG. 8), the parameters of some of those holdings are changed. As illustrated, the amount of the holding that is below the threshold (902) remains unchanged. However, for the quantity of the debt instruments above the threshold (904), there is a change in priority. This change in priority (one of the parameters) attaches to those debt instruments (904) and serves to make them less valuable.

Although illustrative embodiments have been described herein in detail, it should be noted and will be appreciated by those skilled in the art that numerous variations may be made within the scope of this invention without departing from the principle of this invention and without sacrificing its chief advantages. For example, it is possible that the change in parameter of the debt instrument attaches to the debt instrument and is therefore a permanent change. Alternatively, it is possible that the change in parameter of the debt instrument is temporary and only depends on the holdings of the investor or group of investors. In this way, if the conditions that caused the holdings to exceed the threshold are reversed, the condition is removed from the debt instrument. There are of course advantages and disadvantages for each possible embodiment.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A method for creating an incentive for an entity to limit its accumulation of debt issued by a company, the method comprising:

issuing a debt in the form of a debt instrument by the company;

purchasing the debt by the entity;

determining a debt concentration threshold by the company;

associating a condition with the debt instrument, the condition changing at least one parameter of the debt instrument, the condition occurring when the entity holds more of the debt than the debt concentration threshold;

changing the at least one parameter of the debt instrument upon the occurrence of the condition;

and the company issuing a new debt instrument with the changed parameter.

2. A method according to claim 1, further comprising monitoring holdings of debt instruments by entities.

3. A method according to claim 1, further comprising changing the debt concentration threshold.

4. A method according to claim 1, wherein the entity is an investor.

5. A method according to claim 4, wherein the investor is an individual investor.

6. A method according to claim 4, wherein the investor is an institutional investor.

7. A method according to claim 1, wherein the entity is an affiliated group of investors.

8. A method according to claim 1, wherein the entity is a group of investors acting in concert.

9. A method according to claim 1, wherein associating the condition with the debt instrument occurs before issue of the debt instrument.

10. A method according to claim 1, wherein associating the condition with the debt instrument occurs after issue of the debt instrument.

11. A method according to claim 1, wherein the parameter changed by the condition serves to subordinate the debt instrument to other debt instruments.

12. A method according to claim 1, wherein the parameter changed by the condition serves to restrict voting.

13. A method according to claim 1, wherein the parameter changed by the condition serves to restrict redemption of the debt instrument.

14. A method according to claim 1, wherein the parameter changed by the condition serves to change the series of the debt instrument.

15. A method according to claim 1, wherein the debt concentration threshold is a percentage.

16. A method according to claim 1, wherein the debt concentration threshold is a number of shares.

17. A method according to claim 1, wherein the debt concentration threshold is a dollar amount.

* * * * *